(12) United States Patent
Schunk et al.

(10) Patent No.: US 11,617,971 B2
(45) Date of Patent: Apr. 4, 2023

(54) METHOD FOR DEGASSING FLOWABLE FLUIDS

(71) Applicant: HYDAC FILTER SYSTEMS GMBH, Sulzbach/Saar (DE)

(72) Inventors: Andreas Schunk, Waldmohr (DE); Martin Hegmann, Gersheim (DE)

(73) Assignee: HYDAC FILTER SYSTEMS GMBH, Sulzbach/Saar (DE)

( * ) Notice: Subject to any disclaimer, the term of this patent is extended or adjusted under 35 U.S.C. 154(b) by 0 days.

(21) Appl. No.: 17/406,382

(22) Filed: Aug. 19, 2021

(65) Prior Publication Data

US 2021/0379509 A1 Dec. 9, 2021

Related U.S. Application Data

(62) Division of application No. 16/489,733, filed as application No. PCT/EP2018/055204 on Mar. 2, 2018, now abandoned.

(30) Foreign Application Priority Data

Mar. 4, 2017 (DE) ..................... 10 2017 002 080.9

(51) Int. Cl.
*B01D 19/00* (2006.01)
*C01B 3/00* (2006.01)

(52) U.S. Cl.
CPC ..... *B01D 19/0036* (2013.01); *B01D 19/0063* (2013.01); *C01B 3/0015* (2013.01)

(58) Field of Classification Search
CPC ................ B01D 19/00; B01D 19/0036; B01D 19/0063; C01B 3/00
See application file for complete search history.

(56) References Cited

U.S. PATENT DOCUMENTS 7,198,715 B2 * 4/2007 Herges ................. B01D 1/0017
210/120
2004/0094460 A1 5/2004 Herges et al.
(Continued)

FOREIGN PATENT DOCUMENTS

DE 195 10 023 5/1996
DE 197 03 980 7/1999
(Continued)

OTHER PUBLICATIONS

International Search Report (ISR) dated Jun. 7, 2018 in International (PCT) Application No. PCT/EP2018/055204.
(Continued)

*Primary Examiner* — Youngsul Jeong
(74) *Attorney, Agent, or Firm* — Wenderoth, Lind & Ponack, L.L.P.

(57) ABSTRACT

A method for degassing flowable fluids, in particular liquids used for hydrogen storage, uses a device including a desorber (12) that can be filled with fluid to be degassed and through which the fluid can flow. A circulation pump (48) circulates the fluid during a degassing process in the desorber (12). A vacuum pump (38) generates a vacuum in the desorber (12) during a filling step with fluid and for discharging the gas from the desorber (12) during the degassing step. At least one sensor (44a, 44b) measures the pressure in the desorber (12) and/or a dwell time. A control unit ends the degassing process when a predefined pressure is measured by the sensor (44a, 44b) and/or when a predefined dwell time of the fluid in the desorber (12) is measured.

6 Claims, 1 Drawing Sheet

(56) References Cited

U.S. PATENT DOCUMENTS

| | | | |
|---|---|---|---|
| 2005/0109211 A1 | 5/2005 | Shiraishi et al. | |
| 2007/0140916 A1* | 6/2007 | Spiss | B01L 3/021 |
| | | | 422/400 |
| 2012/0279396 A1* | 11/2012 | Brammer | B01D 19/0031 |
| | | | 95/263 |

FOREIGN PATENT DOCUMENTS

| | | |
|---|---|---|
| DE | 101 29 100 | 1/2003 |
| DE | 101 35 420 | 2/2003 |
| DE | 10 2014 012 094 | 2/2016 |
| EP | 2 628 517 | 8/2013 |
| EP | 2 873 649 | 5/2015 |
| EP | 2873649 A1 * 5/2015 | ......... B01D 19/0036 |

OTHER PUBLICATIONS

International Preliminary Report on Patentability and Written Opinion of the International Searching Authority dated Sep. 10, 2019 in International (PCT) Application No. PCT/EP2018/055204.

* cited by examiner

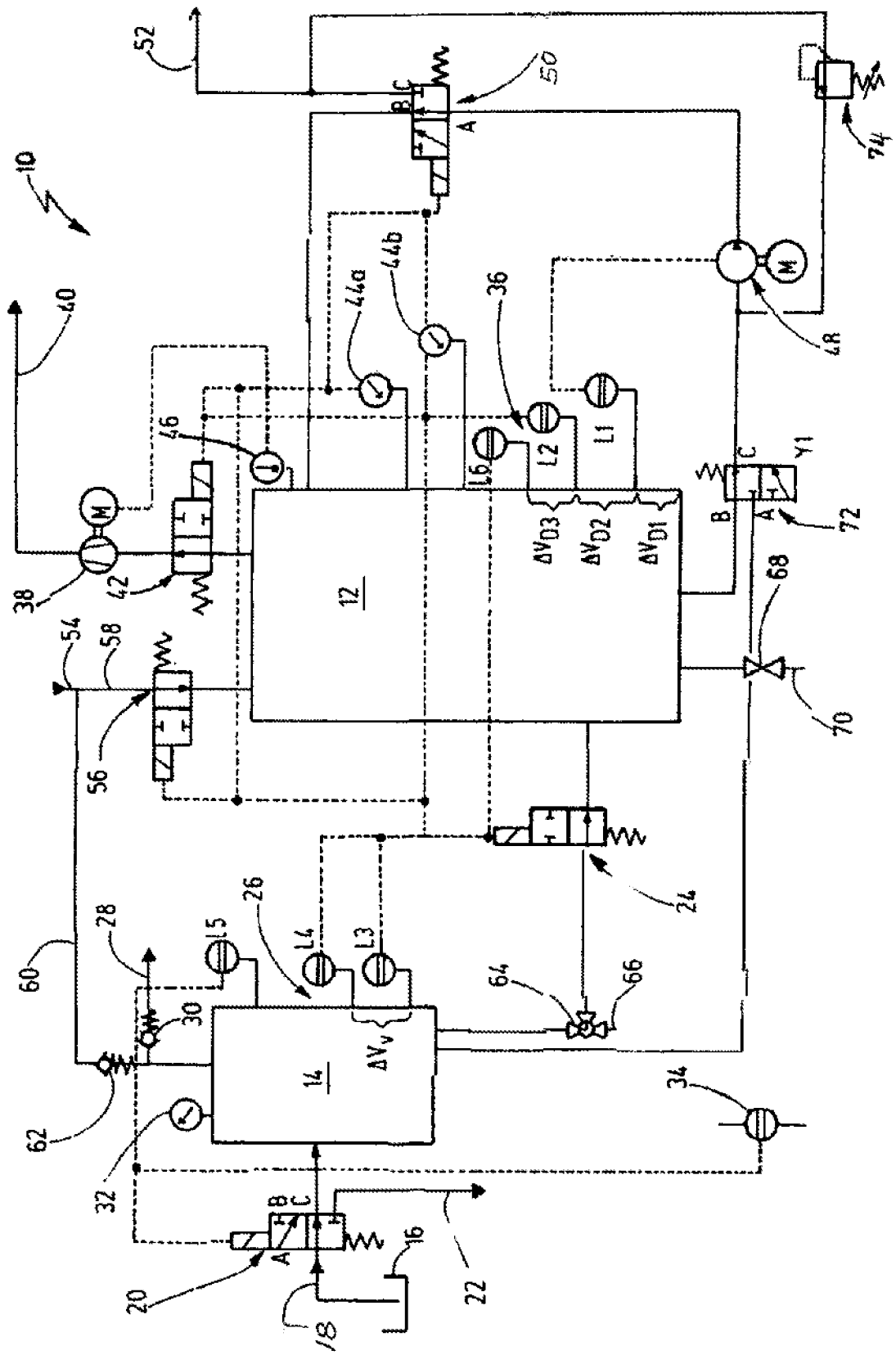

METHOD FOR DEGASSING FLOWABLE FLUIDS

REFERENCE TO RELATED APPLICATION

This application is a divisional of U.S. patent application Ser. No. 16/489,733, filed Aug. 29, 2019, the entire subject matter of which is hereby incorporated by reference.

FIELD OF THE INVENTION

The invention relates to a method for degassing flowable fluids, in particular of liquids used to store hydrogen.

BACKGROUND OF THE INVENTION

Devices and methods for separating fluid mixtures are available in the market in different configurations and for different uses. DE 195 10 023 C1 discloses a device for separating fluid mixtures, in particular of oil and water, using a vacuum container, in which the fluid mixture can be nebulized by a nebulizer device. At least one liquid component of the fluid mixture can be diverted from the vacuum container after separation by a hydraulic pump. The other component can be extracted in the form of gas and/or vapor from the vacuum container by a vacuum pump. The assembly including nebulizing device, vacuum container and assigned pumps has created a device for separating fluid mixtures, which permits an optimal separation of the components while having a small footprint and which is economically advantageous both in production and in operation.

DE 101 35 420 A1 discloses a device for separating a fluid mixture into at least two of its components having a working chamber and a settling chamber, in which the fluid mixture and any settled components thereof are received. A motor-pump unit can be used to convey the fluid mixture from the settling chamber through a cross-flow filter into the working chamber. The motor-pump unit is formed of a submersible pump, which in conjunction with the cross-flow filter is combined into a unit in the working chamber, thereby implementing a two-tank concept having a settling chamber and working chamber. As a result, a versatile device is created, having a small footprint and being particularly suitable for mobile use.

A further device for treating fluid mixtures containing gases, such as in particular hydrogen, air, nitrogen or natural gases, and liquids, in particular ionic liquids, hydraulic oil or process liquids, is known from DE 10 2014 012 094 A1. The known device has at least one separation stage for separating the fluid mixture into a liquid fraction and a gaseous fraction, which is contaminated with a remaining liquid fraction. From the gaseous fraction, the remaining liquid fraction is removed using at least one further separation stage. In the further separation stage, a fine separation is performed, to obtain a gas fraction free of this liquid and to obtain the relevant liquid fraction, such as ionic liquid, in the purity required for use.

Hydrogen is used not only as an industrial gas, but increasingly also as an energy carrier, for instance in agriculture, in industrial plants and condominiums and in vehicles. To avoid the risks of handling a highly volatile and explosive gas, hydrogen is stored in liquids. The liquids, known as "Liquid Organic Hydrogen Carriers", permit the reliable, loss-free storage of hydrogen and simple storage and transport in commercial oil tanks, for instance for supplying a filling station infrastructure. To store hydrogen, for instance, the diesel-type liquid dibenzyltoluene is used, which can be easily, safely and inexpensively handled, stored and transported.

The known devices for separating fluid mixtures reach their limits in the separation of the hydrogen from the hydrogen storage medium. In particular, the release of the stored hydrogen from the liquid carrier requires the handling of the volatile, easily flammable hydrogen after it leaves the hydrogen storage medium. In order to use hydrogen as fuel, for instance for fuel cell vehicles, or to supply hydrogen filling stations, a safe separation of the hydrogen gas from the liquid hydrogen storage medium is required.

SUMMARY OF THE INVENTION

The invention addresses the problem of enabling the separation of hydrogen gas from a liquid hydrogen storage medium in a simple, reliable and safe manner, while effectively preventing the separated hydrogen from igniting/exploding.

The problem is solved by a method for degassing flowable fluids by using a device for degassing flowable fluids according to the invention.

The device used in the method according to the invention for degassing flowable fluids, in particular liquids used to store hydrogen, comprises a desorber, which can be filled with fluid to be degassed that flows therethrough. A circulation pump circulates the fluid during a degassing operation in the desorber. A vacuum pump generates a negative pressure in the desorber while it is filled with fluid and for the discharge of the gas from the desorber during the degassing process. At least one sensor measures the pressure in the desorber and/or the time. A control unit terminates the degassing process when the respective sensors measure a predetermined pressure and/or a predetermined residence time of the fluid in the desorber has been reached.

A central component of the device according to the invention is the desorber, which is filled with the fluid to be degassed and through which the relevant gas from the fluid flows for separating purposes. The assigned fluid flow is generated by the circulation pump, which typically routes the fluid out of the desorber into a circuit and back into the desorber. The vacuum pump has the function of ensuring a safe filling of the desorber by a corresponding negative pressure and of generating a protective atmosphere in the desorber, to provide a reliable environment for the separation of the gas from the fluid, in particular hydrogen from a storage liquid. The gas emerging from the fluid during degassing is discharged from the desorber during the degassing process via the vacuum pump. In this way, any renewed mixing of gas and fluid is prevented.

As soon as the at least one sensor measures a predetermined pressure, which corresponds to a predetermined degassing of the fluid, the control unit terminates the degassing process in the desorber. To ensure that a certain threshold value for the degassing is reached, preferably the time is additionally measured, and the degassing process is terminated when the predetermined pressure has been measured for a predetermined time.

Alternatively or additionally, the degassing process is terminated at the end of a predetermined residence time of the fluid in the desorber, regardless of the progress of degassing of the fluid.

In a preferred embodiment of the device according to the invention, the desorber has structures for increasing the effective separating surface, preferably cylindrical, spherical or conical filling material of stainless steel, which at least partially fill the interior of the desorber. The fluid to be degassed during the degassing operation flows around these structures, in particular the cylindrical stainless-steel filling material. For instance, the release of hydrogen from a liquid hydrogen storage medium, referred to in technical language as "Liquid Organic Hydrogen Carrier", is performed by catalytic processes, which are started at the assigned surface.

Dibenzyltoluene, which is preferably used as the storage medium, is a liquid organic hydrocarbon, which is liquid in a temperature range from −39° C. to 390° C. and can be stored and transported at ambient pressure. The release of stored hydrogen during dehydrogenation is an endothermic process. The method according to the invention permits a fully controllable, continuous release of hydrogen. The hydrogen purity is particularly preferably ensured by a gas scrubbing system, to which the gas discharged from the desorber during the degassing process is routed. For this purpose, for instance, the device known from the DE 10 2014 012 094 A1 can be used.

In a further preferred embodiment of the method according to the invention, a pre-separator is installed between a fluid reservoir and the desorber and is filled with fluid from the fluid reservoir. This filling has the advantage that, in a first process step, the gas emerging from the fluid filled into the pre-separator is separated and, in a second process step, in a special degassing process gas is separated from the fluid transferred into the desorber. The device according to the invention can be operated in a two-stage system based on a pre-separation process and a central separation process. A further advantage of the pre-separator is the continuous filling of the desorber with the fluid to be degassed, such as a Liquid Organic Hydrogen Carrier, from the pre-process. The pre-separator also has the functionality of a collection tank.

The device according to the invention can be used for degassing flowable fluids of various kinds. In this case, individual gases, but also gas mixtures can be separated from a fluid. The size of the device, in particular the size of the desorber and the pre-separator, is selected according to the particular requirements of the application. The degassing device can be permanently installed in a system and firmly connected to the fluid reservoir, a gas outlet and a fluid outlet. However, the device used may be a mobile unit, to be connected to an assigned system for the degassing process, for instance to a hydrogen filling station.

Particularly preferably, a level sensor is provided in the pre-separator and/or in the desorber, having at least one switching point assigned to the filling, emptying and/or degassing operation corresponding to the respective fill level of the fluid. Conveniently, a minimum level and a maximum level of the fluid for the operation of the device according to the invention are specified via the relevant level sensor. When the level rises above the maximum level or falls below the minimum level, the control unit stops or starts to fill fluid into the container. Alternatively, when the maximum is exceeded, at least part of the fluid is discharged untreated from the container concerned. Particularly preferably, the amount of fluid supplied during the filling process or discharged during the emptying process is adjusted via the relevant level sensor. The device according to the invention is used to ensure an optimum process sequence.

In a preferred embodiment of the device used according to the invention, a gas port connected to the pre-separator and/or the desorber is provided to equalize the pressure during emptying. Particularly preferably, a nitrogen cylinder for supplying nitrogen as an inert gas is connected to the gas port of the pre-separator or the desorber. In addition to the pressure required for emptying, a gas atmosphere is generated in the interior, which effectively prevents the ignition/explosion of any residual amount of separated hydrogen remaining in the desorber.

In a further preferred embodiment of the device used according to the invention, a gas outlet, which adjoins a valve device and the vacuum pump, and a fluid outlet, which adjoins the circulation pump and a valve device, are arranged at the desorber. The gas emerging from the fluid is removed through the gas outlet during the degassing process. Particularly preferably, a filtration and/or purification unit adjoins the gas outlet for any gas scrubbing of the separated gas that may be required. After the completion of the degassing operation, the degassed fluid is discharged from the desorber via the fluid outlet and advantageously fed to a collecting device or to a further use.

It is also advantageous that a valve device and a further valve device assigned to a further fluid supply line, preferably a stop-cock, are arranged between the pre-separator assigned to one fluid supply line and the desorber. The desorber depending on the position of the further valve device can be filled with fluid to be degassed via the fluid supply line and the pre-separator or via the further fluid supply line. This method results in the advantage that the desorber can be filled either via the pre-separator or directly from the fluid reservoir.

The invention further relates to the use of the device according to the invention for degassing flowable fluids. Fluid to be degassed is circulated in the desorber by the circulation pump during the degassing process and the gas is routed from the desorber to the gas outlet by the vacuum pump. The degassing process is terminated when a predetermined pressure is measured and/or at the end of a predetermined residence time of the fluid in the desorber.

In the use according to the invention, fluid is routed to and from a container, in this case the desorber, in an aggregate, in which a vacuum is generated by the vacuum pump, and the fluid is degassed by the vacuum. The gas, which escapes from the fluid due to the negative pressure in the desorber, is extracted by the vacuum pump and exits at the gas outlet. During the degassing process, the fluid in the desorber is recirculated, and the pressure in the desorber is measured to draw inferences as to the gas content in the fluid from the measured pressure. According to the invention, the degassing process is terminated upon reaching a predetermined gas content or an assigned pressure or at the end of a predetermined time.

In a preferred variant of the method according to the invention, a further gas, preferably nitrogen, is routed for pressure equalization into the desorber for an emptying process via a feed line, and then the degassed fluid is routed from the desorber to the fluid outlet by the circulation pump. In this way, a safe, trouble-free emptying of the desorber after the degassing process has been completed is guaranteed.

In a further preferred variant of the method according to the invention, a negative pressure in the desorber is generated during the filling process by the vacuum pump, and then degassing fluid is routed from a fluid reservoir into the desorber via the fluid supply line and the pre-separator or via the further fluid supply line. The dual function of the vacuum pump of generating negative pressure both during the filling process and during degassing results in a compact design and a simple construction of the device used.

Further, it is also advantageous that in a first operating mode of the device during the filling process, a valve assigned to the fluid supply line is opened and fluid to be degassed is routed from the fluid reservoir into the pre-separator until a first switching point of the assigned level sensor is reached. The valve arranged between the pre-separator and the desorber is opened, and the at least partially degassed fluid from the pre-separator is routed into the desorber until a second switching point of the assigned further level sensor is reached. The valve upstream of the pre-separator and the valve installed between the pre-separator and the desorber are closed. In addition, it is advantageous that in a second operating mode of the device during the filling process, the valve upstream of the desorber and assigned to the further fluid supply line is opened, and fluid to be degassed is routed from the fluid reservoir into the desorber until a second switching point of the assigned further level sensor is reached, and the assigned valve device is closed.

By the corresponding opening and closing of valves, the filling process is controlled in the method according to the invention. The levels required for the respective process steps are set in the pre-separator and in the desorber. Particularly preferably, the volume of fluid discharged from the desorber during the emptying process matches the volume of fluid supplied during the filling process. In this way, the system can be operated based on the invention in a particularly simple manner.

In a further preferred variant of the method according to the invention, the fluid is a medium used for hydrogen storage, preferably dibenzyltoluene, from which hydrogen is separated by the device used. The use can be subsequent to storage or transport of the hydrogen-charged storage medium. Particularly preferably, the device used according to the invention is firmly integrated in a system or designed as a mobile unit.

The above-mentioned features and the further disclosed features according to the invention can be implemented individually or in any combination at a device and for the method of using the device.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

The FIGURE a schematic circuit diagram of the device according to the invention for the degassing of flowable fluids that is not to scale.

DETAILED DESCRIPTION OF THE INVENTION

The FIGURE shows a device 10 for degassing flowable fluids having a desorber 12 and a pre-separator 14. The pre-separator 14 is connected to a fluid reservoir 16 via a fluid supply line 18.

A first valve 20, designed as a directional valve, is arranged in the fluid supply line 18. In a first valve position of the first valve device 20, the fluid reservoir 16 is connected to the pre-separator 14. In a second valve position, the fluid reservoir to an emergency overflow 22. A second valve 24, designed as a directional valve, is arranged in a connecting line between the pre-separator 14 and the desorber 12. The assigned fluid path is open in a first valve position of the second valve 24 and closed in its second valve position. A level sensor 26 having the switching points L3, L4 and L5 is arranged in the pre-separator 14. The gas emerging from the fluid to be degassed in the pre-separator 14 exits from the pre-separator 14 at a gas outlet 28. A check valve 30 is arranged in a connecting line from the pre-separator 14 to the gas outlet 28. A pressure sensor 32 for measuring the pressure in the pre-separator 14 is provided at the pre-separator 14. The device 10 has a drip tray (not shown in the FIGURE) having a float switch 34 disposed therein.

A further level sensor 36 having the switching points L1, L2 and L6 and in addition a vacuum pump 38 are arranged at the desorber 12 in a connecting line to a further gas outlet 40. A third valve 42, designed as a directional valve, is arranged between the desorber 12 and the vacuum pump 38. The assigned fluid port is open in a first valve position of the third valve device 42 and closed in its second valve position. Two further pressure sensors 44a and 44b are provided for measuring the pressure in the desorber 12. Further, a temperature sensor 46 is disposed at the desorber 12.

A fourth valve 50, designed as a directional valve, the desorber 12 and a circulation pump 48 are arranged in a line circuit. In a first valve position of the fourth valve 50, the line arriving from the circulation pump 48 is connected to a return line leading to the desorber 12 so that the circuit for circulating the fluid flowing through the desorber 12 is closed. In a second valve position of the fourth valve 50, the line arriving from the circulation pump 48 is connected to a fluid outlet 52 so that the fluid path for discharging fluid from the desorber 12 to the fluid outlet 52 is opened. The vacuum pump 38 and the circulation pump 48 can each be driven by a motor M.

Furthermore, a gas port 54 leads to the desorber 12, a fifth valve 56, designed as a directional valve, is arranged in a feed line 58 between the gas port 54 and the desorber 12. The fifth valve 56 opens the fluid path in a first valve position via the supply line 58, and blocks it in a second valve position. A further supply line 60 leads from the gas port 54 to the pre-separator 14. A further check valve 62 is arranged in the further supply line 60.

A further valve 64, designed as a stop cock, is arranged in the connecting line between the pre-separator 14 and the desorber 12. Valve 64 can be used to separate the pre-separator 14. Via a further fluid supply line 66, fluid can be routed from the fluid reservoir 16 into the desorber 12. In addition to the fluid outlet 52, a fluid discharge line 70, which can be closed and opened by a shut-off valve 68, is formed at the desorber 12.

The device 10, whose hydraulic circuit diagram can be seen in the FIGURE, can be operated in three different operating modes, system operation, degassing from the fluid reservoir and manual operation. The control unit can be used to select individual operating modes.

The operating mode system operation requires that the further valve 64, designed as a 3/2-way ball valve, is set between the pre-separator 14 and the desorber 12 such that the pre-separator 14 can be connected to the desorber 12 in a fluid conveying manner. The flowable fluid, for instance a liquid hydrogen storage medium, is supplied to the preliminary switch point L3 of the device 10 by overpressure in the assigned system. To this end, the first valve device 20 is energized and brought into the first valve position A-B shown in FIG. 1. As soon as the fluid level corresponding to the second switching point L4 in the pre-separator 14 is detected by the level sensor 26, the second valve device 24 is opened and brought into the first valve position shown in FIG. 1. The vacuum pump 38 generates a negative pressure in the desorber 12. As a result of the pressure difference between the pre-separator 14 and the desorber 12, the fluid flows into the desorber 12 when the second valve device 24 is open. The further check valve 62 arranged in the further supply line 60 keeps the pressure in the pre-separator 14 constant, to enable the pre-separator 14 to be emptied. Instead of the check valve 62, optionally a pressure regulator (not shown in FIG. 1) may also be used. The second valve device 24 remains open during the filling process until the fluid level corresponding to the third switching point L6 is reached, as measured by the further level sensor 36 in the desorber 12. The gas delivered by the vacuum pump 38 from the desorber 12 is removed by a suitable venting system, which adjoins the further gas outlet 40.

If, in the event of a fault, the fluid cannot flow from the pre-separator 14 to the desorber 12, the fluid level corresponding to the third switching point L5 in the pre-separator 14 is reached. The third switching point L5 of the level sensor 26 corresponds to a maximum level of the fluid in the pre-separator 14. In this case, the power supply to the first valve 20 is interrupted, and first valve 20 is brought into the second valve position A-C. The fluid flows untreated via the emergency overflow 22, preferably via a hose connected there, back into the fluid reservoir 16 or a separate collection tank.

The fluid to be degassed is circulated in the desorber 12 by the circulation pump 48. The circulation pump 48 only runs if the fluid level corresponding to the first switching point L1 is exceeded, as measured by the further level sensor 36 in the desorber 12. The first switching point L1 of the further level sensor 36 corresponds to a minimum level of the fluid in the desorber 12. When flowing through the desorber 12 and when flowing around the structure increasing the effective separation area arranged in the desorber 12, gas exits the fluid. That gas is pumped out by the vacuum pump 38. The temperature sensor 46 measures the temperature of the exited gas, for instance hydrogen. If the temperature exceeds a value that is critical for the components used, for instance 40° Celsius, the device 10 is switched off for safety reasons as protection from explosions. In this case, the fluid flows back into the fluid reservoir 16 untreated, for instance, in to a tank, because the power supply of the first valve 20 is also interrupted and it is brought into the second valve position A-C.

The fluid is circulated in the desorber 12 until the further pressure sensor 44b measures a preset target pressure for a set holding time and the set residence time of the fluid in the desorber 12 has elapsed. The control unit of the device 10 can be used to set the target pressure, the holding time and the residence time. In a particularly simple embodiment of the use of the device 10 for degassing a flowable fluid, the holding time can be omitted. The third valve 42 connected upstream of the vacuum pump 38 is closed to terminate the degassing process, and then the fifth valve 56 assigned to the gas port 54 is opened until the pressure in the desorber 12 is equalized. The pressure equalization is, for instance, performed using nitrogen from a nitrogen gas cylinder.

The fifth valve 56 is closed again after a pressure of approximately 1000 mbar has been reached, measured by the further pressure sensor 44a in the desorber 12. If the pressure in the desorber 12 cannot be equalized, an error message to that end is output by the control unit. In an optional arrangement of a pressure regulator (not shown in FIG. 1), the fifth valve 56 remains open, and the pressure in the desorber 12 is kept constant by the pressure regulator. Subsequent to the pressure equalization, the fourth valve 50 is actuated and the fluid is pumped out of the desorber 12 via the circulation pump 48 until a fluid level corresponding to the second switching point L2 is reached in the desorber 12. Then, the fourth valve 50 is returned to the first valve position shown A-B and the third valve 42 assigned to the vacuum pump 38 is opened again. The cycle begins again when a fluid level corresponding to the second switching point L4 is reached again in the pre-separator 14.

In the second operating mode of degassing from the fluid reservoir 16, the device 10 itself draws the fluid to be degassed from the fluid reservoir 16, for instance a tank, into the desorber 12. To do so, the fluid reservoir 16 must be connected to the assigned inlet on the further valve 64 by the further fluid supply line 66, which in particular is formed as a tube or hose. The second operating mode requires that the further valve 64, designed as a 3/2-way ball valve installed between the pre-separator 14 and the desorber, 12 is set in such a way that the fluid reservoir 16 is connected to the desorber 12 in a fluid conveying manner.

The filling, degassing and emptying processes in the desorber 12 proceed in accordance with the first operating mode. The first and second operating modes differ in the number of stages of separation. In the first operating mode, two separation stages, one in the pre-separator 14 and one in the desorber 12, are performed, whereas in the second operating mode only one separation stage is performed in the desorber 12. The pre-separator 14 is not used in the second operating mode and the switching points L3 and L4 of the assigned level sensor 26 are not active in this operating mode. In order to protect the pre-separator 14 from overfilling, the third switching point L5 is active in the second operating mode as well.

In the third operating mode, the valves 20, 24, 42, 46 and 50 assigned to the pre-separator 14, the desorber 15, 12, the further gas outlet 40, the gas port 54 and the fluid outlet 52 are switched manually. The vacuum pump 38 and the circulation pump 48 are also switched on and off manually.

Before the vacuum pump 38 is switched on, pressure equalization must be performed in the desorber 12. For this purpose, the third valve 42 and the fifth valve 56 are opened until the pressure equalization in the desorber 12 has been completed. The assigned measurement is performed via the further pressure sensor 44a. During startup of the vacuum pump 38, the two valves 42, 56 cannot be switched manually. The two preceding paragraphs relate to the use of a diaphragm pump, but not to the use of a rotary vane pump.

If the third switching point L6 is reached in the desorber 12, the second valve 24 is closed, and manual operation is bypassed in this respect. If the third switching point L5 is achieved in the pre-separator 14, the first valve 20 is de-energized, and the fluid 5 flows untreated back into the fluid reservoir 16 via the emergency overflow 22. The first valve device 20 is then in the second valve position A-C.

The float switch 34 arranged in the drip pan is activated upon the exit of fluid. In this case, the vacuum pump 38 is switched off and the second valve 24 is closed and the first valve 20 is de-energized. In order to prevent the desorber 12 from being overfilled, the second valve 24 is closed when the fluid level corresponding to the third switching point L6 in the desorber 12 is reached. The level sensors 26, 36 are designed as openers at the pre-separator 14 and the desorber 12. In the event of a cable break of the level sensors 26, 36 or the sensors 32, 44a, 44b and 46, the device 10 is turned off.

Particularly preferably, a measurement data logging is provided in the apparatus 10 for degassing of flowable fluids, in particular when used for discharging a liquid hydrogen storage medium. The switching position of the valves 20, 24, 42, 50 and 56 can be recorded as a function of time. Also, the status of the motors M of the circulation pump 48 and the vacuum pump 38 may be recorded as a function of time. Further, the pressure and the temperature in the desorber 12 are recorded as measured data. Pressures above 400 mbar are measured using the first further pressure sensor 44a for the measuring range 0 to 1000 mbar. Pressures below 400 mbar are measured using the second further pressure sensor 44b in the measuring range 0-400 mbar. The control unit of the device 10 can be used to set the measuring interval and the logging time. The recorded measurement data are advantageously stored in the device 10 and output via a media port, for instance a USB port as a CSV file, and transferred to an external storage medium. However, online measurement data logging during operation of the device 10 is also conceivable.

In the exemplary embodiment shown, the fluid volume $\Delta V_V$ between the first and second switching point L3, L4 of the level sensor 26 in the pre-separator 14 is 10.5l. The fluid volume $\Delta V_D 3$ between the second and third switching point L2, L6 of the further level sensor 36 in the desorber 12 is also 10.5l. Thus, the volume of fluid fed from the pre-separator 14 into the desorber 12 during filling matches the volume of fluid discharged from the desorber 12 during emptying. The fluid volume $\Delta V_D 2$ between the first and second switching points L1, L2 of the further level sensor 36 is 1.10l. The minimum level corresponding to the first switching point L1 of the further level sensor 36 $\Delta V_{DI}$ is 1.05l.

Depending on the configuration of the device 10 and the container dimensions of the pre-separator 14 and the desorber 12, the corresponding fluid volumes vary and will be selected as needed. As an alternative to the filling via the further valve 64 and the second valve 24 using a pressure difference, the desorber 12 can be filled using a pump, such as the circulation pump 48. In this variant of the inventive device 10 for degassing flowable fluids, a sixth valve 72 is disposed in the fluid line routed from the desorber 12 to the circulation pump 48 and further connected to the pre-separator 14 in a fluid-conveying manner. In the first valve position of the sixth valve 72, designed as a 3/2-way directional valve shown in FIG. 1, the desorber 12 is connected to the circulation pump 48 during degassing according to the circulation operation. In the second valve position of the sixth valve 72, the pre-separator 14 is connected to the circulation pump 48 in accordance with a filling process, such that the pump 48 can pump fluid from the pre-separator 14 into the desorber 12 via the fourth valve 50. A further fluid line branches off from the connecting line between the sixth valve 72 and the circulation pump 48, which fluid line leads to the fifth valve 50 in the direction leading to the fluid outlet 52 fluid line and includes a pressure relief valve 74 as a safety valve for the circulation pump 48.

While one embodiment has been chosen to illustrate the invention, it will be understood by those skilled in the art that various changes and modifications can be made therein without departing from the scope of the invention as defined in the claims.

The invention claimed is:

1. A method of degassing hydrogen from a liquid used for hydrogen storage using a device comprising a desorber, a gas port connected to the desorber, a circulation pump, a vacuum pump, a sensor and a control unit, the method comprising the steps of:
    filling the desorber with liquid containing hydrogen to be degassed during a filling step with the liquid at a negative pressure generated in the desorber by the vacuum pump;
    flowing the liquid through the desorber;
    circulating the liquid during a degassing step that produces hydrogen gas by dehydrogenation in the desorber by the circulation pump;
    discharging hydrogen gas from the desorber during the degassing step by the vacuum pump;
    measuring pressure in the desorber and/or measuring residence time of the liquid in the desorber by the sensor;
    terminating the degassing step by the control unit when the sensor measures a predetermined pressure and/or a predetermined residence time of the liquid in the desorber; and
    supplying a further gas via the gas port into the desorber during a discharge of degassed liquid from the desorber such that pressure is equalized in the desorber and a gas atmosphere is generated in an interior of the desorber, in addition to pressure required for emptying the desorber, effectively preventing ignition of any residual amount of separated hydrogen remaining in the desorber.

2. A method according to claim 1 wherein the further gas is nitrogen.

3. A method according to claim 1 wherein the degassed liquid is conveyed from the desorber to a fluid outlet by the circulation pump.

4. A method according to claim 1 wherein the liquid containing hydrogen to be degassed is conveyed from a fluid reservoir into the desorber via a fluid supply line during the filling of the desorber.

5. A method according to claim 1 wherein the liquid containing hydrogen to be degassed is conveyed from a fluid reservoir into the desorber via a fluid supply line and a pre-separator during the filling step.

6. A method according to claim 5 wherein, during the filling step,
    a first valve in the fluid supply line is opened when the liquid to be degassed is conveyed from the fluid reservoir into the pre-separator until a first switching point of a first level sensor is reached;
    a second valve located between the pre-separator and the desorber is opened with partially degassed liquid being conveyed to the desorber via the second valve until a second switching point of a second level sensor is reached in the desorber; and
    the first and second valves are closed when the first and second switching points are reached.

* * * * *